United States Patent
Kuntz et al.

(10) Patent No.: US 7,081,282 B2
(45) Date of Patent: Jul. 25, 2006

(54) OPTICALLY VARIABLE MARKING

(75) Inventors: Matthias Kuntz, Seeheim-Jugenheim (DE); Reiner Delp, Darmastadt (DE); Rodney Riddle, Poole (DE); John Patrick, Wareham (GB); Robert Hammond-Smith, Fordingbridge (GB)

(73) Assignee: Merck Patent GmbH, Darmstadt (DE)

( * ) Notice: Subject to any disclaimer, the term of this patent is extended or adjusted under 35 U.S.C. 154(b) by 596 days.

(21) Appl. No.: 10/184,944

(22) Filed: Jul. 1, 2002

(65) Prior Publication Data

US 2003/0012935 A1    Jan. 16, 2003

(30) Foreign Application Priority Data

Jul. 2, 2001    (EP) ................... 01114895

(51) Int. Cl.
| | |
|---|---|
| *B32B 15/04* | (2006.01) |
| *B32B 15/08* | (2006.01) |
| *B44C 1/22* | (2006.01) |
| *B23K 26/00* | (2006.01) |

(52) U.S. Cl. ................ 428/1.6; 428/1.3; 428/187; 428/137; 428/607; 216/23; 216/94

(58) Field of Classification Search ............. 428/606, 428/607, 614, 131, 134, 137, 138, 187, 542.2, 428/1.1, 542.6, 1.6, 916, 1.3, 1.31; 359/1, 359/15; 493/961; 340/568.1, 572.1; 216/23, 216/32, 94, 95

See application file for complete search history.

(56) References Cited

U.S. PATENT DOCUMENTS

| 5,364,557 A | 11/1994 | Faris |
| 5,492,370 A * | 2/1996 | Chatwin et al. ........... 283/110 |
| 5,678,863 A | 10/1997 | Knight et al. |
| 5,834,072 A | 11/1998 | Schonfeld et al. |
| 6,082,778 A | 7/2000 | Solmsdorf |
| 6,686,027 B1 * | 2/2004 | Caporaletti et al. ........... 283/72 |

FOREIGN PATENT DOCUMENTS

| DE | 195 04 224 | 8/1995 |
| EP | 0 261 712 | 3/1988 |
| EP | 0 435 029 | 7/1991 |
| EP | 0 601 483 | 6/1994 |
| EP | 0 606 940 | 7/1994 |
| EP | 678 400 | 10/1995 |
| EP | 0 982 605 | 3/2000 |
| GB | 2 268 906 | 1/1994 |
| GB | 2 328 207 | 2/1999 |
| WO | WO 93/22397 | 11/1993 |
| WO | WO 94/22976 | 10/1994 |
| WO | WO 95/22586 | 8/1995 |
| WO | WO 96/02597 | 2/1996 |
| WO | WO 97/00600 | 1/1997 |
| WO | WO 97/27251 | 7/1997 |
| WO | WO 97/27252 | 7/1997 |
| WO | WO 97/30136 | 8/1997 |
| WO | WO 97/35219 | 9/1997 |
| WO | WO 98/00428 | 1/1998 |
| WO | WO 99/02340 | 1/1999 |
| WO | WO 99/11719 | 3/1999 |
| WO | WO 02/06195 | 1/2002 |
| WO | WO 02/06196 | 1/2002 |
| WO | WO 02/06265 | 1/2002 |

* cited by examiner

*Primary Examiner*—Michael E. Lavilla
(74) *Attorney, Agent, or Firm*—Millen, White, Zelano, Branigan, P.C.

(57) ABSTRACT

The invention relates to an optically variable marking comprising a semiopaque substrate with a first surface that is covered with an optically variable layer that is for example a liquid crystal polymer layer or a layer comprising pearlescent pigments, and a second surface that is partially covered with a metal layer in the shape of a pattern, to methods of its preparation and to its use for decorative or security applications.

27 Claims, No Drawings

OPTICALLY VARIABLE MARKING

FIELD OF THE INVENTION

The invention relates to an optically variable marking comprising an optically variable layer that is for example a liquid crystal polymer layer or a layer comprising pearlescent pigments, to methods of preparing such an optically variable marking, and to its use for decorative or security applications.

BACKGROUND AND PRIOR ART

The use of liquid crystal polymers films as security devices has been reported in prior art. EP 0 435 029 discloses a data carrier with an optically variable security element that contains an oriented liquid crystal polymer. U.S. Pat. No. 5,678,863 (corresponding to GB 2,268,906) discloses a security marking for a document of value comprising a watermark coated with a cholesteric liquid crystal material producing optical effects which differ when viewed in transmitted and reflected light. The cholesteric liquid crystal material is for example a liquid crystal polymer.

However, the devices described in prior art have several drawbacks. Thus, the security element described in EP 0 435 029 is limited inasmuch that only the reflected colour of the liquid crystal polymer can be seen in the final element, since the liquid crystal layer is produced as part of a laminate structure with a solid black background. Also, the production of the device security element requires several steps, such as preparing the liquid crystal polymer film, transferring the liquid crystal polymer film from one substrate into another and then forming a laminate structure.

The security marking described in U.S. Pat. No. 5,678,863 implies a pre-treatment of the document of value to impart a watermark, or areas of differing optical density. The liquid crystal coating applied will appear differently in reflection and transmission and in addition will enhance the area of the watermark by appearing differently in areas of different optical density.

An aim of the present invention is to provide an optically variable marking, in particular for decorative and security applications, that does not have the drawbacks of the prior art devices, is easy to manufacture and can be applied to a broad variety of substrates, surfaces and objects.

Upon further study of the specification and appended claims, further objects and advantages of this invention will become apparent to those skilled in the art.

The inventors of the present invention have found that the above aims can be fulfilled by providing an optically variable marking comprising a semiopaque substrate with a first surface that is covered with an optically variable layer, and a second surface that is covered with metal layer a part of which is removed in the shape of a pattern. The optically variable layer is for example a liquid crystal polymer layer or a layer comprising pearlescent pigments dispersed in a transparent binder. When the marking is viewed from its metal layer side, the pattern is visible as a dark region in the metal layer. When the marking is viewed from its transflective layer side, in vertical rumination the optically variable layer appears as a uniform layer showing a reflection colour that varies with the viewing angle, whereas in transmission the pattern in the metal layer can be seen through the optically variable layer and the semiopaque substrate.

The optically variable marking according to the present invention overcomes the limitations of EP 0 435 029 by having both reflective and transmissive views possible. An advantage over the security markings described in U.S. Pat. No. 5,678,863 is that the document itself needs no pre-treatment but can include the marking as part of its structure. For example, the described marking can be added to the document for example by weaving it into the paper using a process known to one skilled in the art or by applying it as a transfer using a hot stamping foil process. In addition, in the present invention no visible markings are seen when the device is viewed in reflection, giving the document a hidden feature. Furthermore, the optically variable marking of the present invention is easy to manufacture, as will be shown below.

Another advantage of the optically variable marking of the present invention compared to prior art devices is that the optically variable film can be made ready for use in one roll to roll process involving coating, laminating, curing and rewinding. At this stage the product is a reflecting film. Later treatment of the film by exposure to laser energy can remove the metallised layer in defined regions. The design can therefore be changed without the necessity of changing the material of the document itself.

Definition of Terms

The term "optically variable" as used in this application means layers, coatings, devices, pigments and materials that are substantially transparent when viewed in transmission and, when viewed against a dark substrate, show a reflection colour that varies with the viewing angle. Typical examples of optically variable materials or pigments that are known in prior art are, for example, cholesteric liquid crystal coatings with planar alignment or platelet shaped liquid crystal pigments prepared from such coatings, as well as interference or pearl-lustre pigments, like for example flakes of mica, $SiO_2$, $Al_2O_3$, $TiO_2$ or glass that are coated with one or more layers of, e.g., titanium dioxide, iron oxide, titanium iron oxide or chrome oxide or combinations thereof.

The term 'film' as used in this application includes self-supporting, i.e. free-standing, films that show more or less pronounced mechanical stability and flexibility, as well as coatings or layers on a supporting substrate or between two substrates.

The term 'marking' includes films or layers covering the entire area of a substrate, as well as markings covering discrete regions of a substrate for example in the shape of a regular pattern or image.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behaviour. Liquid crystal compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerised.

For the sake of simplicity, the term 'liquid crystal material' is used hereinafter for both liquid crystal materials and mesogenic materials, and the term 'mesogen' is used for the mesogenic groups of the material.

The director means the preferred orientation direction of the long molecular axes (in case of calamitic compounds) or short molecular axis (in case of discotic compounds) of the mesogens in a liquid crystal material.

The term 'planar structure' or 'planar orientation' refers to a layer or film of liquid crystal material wherein the director is substantially parallel to the plane of the film or layer.

The term 'homeotropic structure' or 'homeotropic orientation' refers to a layer or film of liquid crystal material wherein the director is substantially perpendicular to the film plane, i.e. substantially parallel to the film normal.

SUMMARY OF THE INVENTION

The invention relates to an optically variable marking comprising a semiopaque substrate with a first surface that is covered with an optically variable layer and a second surface that is partially covered with a metal or metallised layer in the shape of a pattern.

The invention further relates to a method of preparing an optically variable marking as described above and below by coating a layer of polymerisable cholesteric liquid crystal material onto the first surface of a semiopaque substrate the second surface of which is metallised, aligning the cholesteric material into planar orientation, polymerising the aligned material in its cholesteric phase, and removing selected areas of the metal layer form the second substrate surface by means of a laser to form a pattern. Alternatively, the first surface can be coated with a layer of polymerizable cholesteric liquid crystal material and subsequently, the second surface can be metallised.

The invention further relates to a method of preparing an optically variable marking as described above and below by coating a layer of optically variable pigments dispersed in a transparent binder onto the first surface of a semiopaque substrate the second surface of which is metallised, optionally curing the transparent binder, and removing selected areas of the metal layer surface by means of a laser to form a pattern The invention further relates to the use of an optically variable marking as described above and below in optical elements, decorative or security applications.

The invention further relates to a security marking, thread or device, hologram, hot stamping foil or watermark, in particular for the purpose of prevention of counterfeiting, authentification, verification, or identification of data or information, comprising an optically variable marking as described above and below.

The invention further relates to a data carrier or document of value comprising a marking, thread, device, hologram, hot stamping foil or watermark as described above.

DETAILED DESCRIPTION OF THE INVENTION

The optically variable marking according to the present invention is preferably prepared as a multilayer film by coating an optically variable layer onto the backside of a metallised dark substrate, and removing the metal coating for example using lasermarking technology. As the substrate is dark, but not 100% absorptive, it allows transmission of light through the sample in the lasermarked regions. When viewed in normal conditions, i.e. without a strong light source behind the film, the reflected colour of the optically variable layer is seen and no design is discernible. However when viewed against a strong light source the design is visible at the places where light is transmitted through the substrate and the film. The transmitted light is of a different colour than the reflected light.

In a preferred embodiment of the present invention the optically variable layer comprises a cholesteric liquid crystal (CLC) material. A CLC material in the cholesteric phase exhibits a helically twisted molecular structure. In a layer of CLC material that is macroscopically aligned into planar orientation, i.e. wherein the helix axis is perpendicular to the plane of the layer, incident light interacts with the helically twisted structure of the CLC material. As a result the CLC layer shows selective reflection of 50% of the intensity of incident light of a specific wavelength as circularly polarized light having the same handedness as the cholesteric helix. The remaining 50% are transmitted as circularly polarized light having opposite handedness. Thus, when viewed against a dark or black substrate the reflection colour of a CLC material is clearly visible on a dark background, whereas when viewed in transmission the CLC material is transparent and the reflection property is perceptible mainly as a pattern of interference colours under altering viewing angles.

The central wavelength of reflection $\lambda$ depends on the pitch p and the average refractive index n of the CLC material according to the equation $\lambda = n \cdot p$.

The effective helical pitch of the CLC layer that interacts with incident light and thereby the wavelength of the reflected light are varying depending on the viewing angle. This results in a shift of the reflection colour of the CLC layer to shorter wavelengths when being viewed at increasing angles from normal. Preferably the CLC material reflects light in the visible wavelength range. The CLC material may also be selected such that it reflects a broad wavelength band or the entire visible spectrum, so that no specific reflection colour is seen in direct view, but can be made visible by observation through a circular polariser. Broad waveband CLC films or coatings and their preparation are described, e.g., in EP 0 606 940, WO 97/35219, EP 0 982 605 and WO 99/02340.

In another preferred embodiment of the present invention the optically variable layer comprises one or more pearl-lustre or interference pigments dispersed in a transparent binder.

Suitable pigments are for example flakes comprising a substrate of, e.g., mica, $SiO_2$, $Al_2O_3$, $TiO_2$ or glass that is coated with one or more layers of e.g. titanium dioxide, iron oxide, titanium iron oxide or chrome oxide or combinations thereof, or flakes comprising combinations of metal and metal oxide. Further preferred are metal flakes of e.g. aluminium coated with layers of iron oxide and/or silicon dioxide. It is also possible to use cholesteric liquid crystal pigments comprising a polymerized or crosslinked CLC material, as described for example in U.S. Pat. No. 5,364,557, U.S. Pat. No. 5,834,072, EP 0 601 483, WO 94/22976, WO 97/27251, WO 97/27252, WO 97/30136, WO 99/02340 or WO 99/11719, or mixtures of pearl-lustre and CLC pigments. Particularly suitable are pearlescent pigments such as, for example, the commercially available Iriodin®, Xirallic® or Colorstream® pigments (from Merck KGaA, Darmstadt, Germany), Paliochrome® pigments (from BASF AG, Ludwigshafen,Germany), Flex® pigments (Flex Inc., Santa Rosa, Calif., USA), or Helicone® cholesteric liquid crystal pigments (from Wacker-Chemie GmbH, München, Germany).

Suitable binder systems and further additives that can be used with the above pigments are known in prior art and are described, for example, in WO 97/27251, WO 97/27252 and WO 99/11719.

The optically variable layer thickness is preferably 1 to 50 microns, especially 1 to 10 microns. Particularly preferred are layers in the range of 1 to 5 microns.

The metallised layer thickness is preferably 10 to 1000 nanometers, especially 100 to 500 nanometers. Particularly preferred are layers in the range 200 to 300 nanometers.

Suitable substrates for use in the optically variable marking according to the present invention include films, paper, board, leather, cellulose sheeting, textiles, plastics, glass, ceramics and metals. Suitable plastics are polymer films of for example polyester such as polyethylene terephthalate (PET), polyvinyl alcohol (PVA), polycarbonate (PC) or di- or triacetyl cellulose (TAC). For example PET films are commercially available from ICI Corp. under the trade name Melinex. Semiopaque substrates are commercially available from CPFilms.

The semiopaque substrate is preferably a plastic film that is darkened, for example to about 95% absorbance, by incorporation of light absorbing particles, like for example carbon black.

Especially preferred are semiopaque paper or plastic substrates metallised with aluminium.

Another preferred embodiment relates to the use of a circular polariser, for example a plastic circular polariser film, as the substrate. When metallised, this will appear as a black film when viewed in reflection. In the areas that have been treated so as to remove the metal coating the polariser film will transmit more light.

Metal or metallised layers can be selected e.g of Al, Cu, Ni, Ag, Cr or alloys like e.g. Pt—Rh or Ni—Cr. Readily metallised semiopaque substrates are directly commercially available.

The metal surface of the semiopaque substrate is then patterned preferably by lasermarking for example with a Nd-YAG-laser, a $CO_2$-laser or an excimer-laser. Thereby, the metal is removed from the substrate to leave a pattern on the substrate.

The substrate surface is preferably planar, but may also be structured, patterned and/or have a relief. The shape, structure, pattern and/or relief of the substrate is preferably adapted to the desired application of the inventive birefringent marking. Suitable structuring and patterning techniques are well known to the one skilled in the art, in particular in the fields of precision engineering and microtechnology, and include lithography, etching, cutting, stamping, punching, embossing, molding and electron discharge machining techniques.

If a polymerisable CLC material is used, it is preferably a mixture of mesogenic compounds having one polymerisable group and mesogenic compounds having two or more polymerisable functional groups (di- or multireactive or di-or multifunctional compounds). Polymerisation of such a mixture yields a three-dimensional polymer network which is self-supporting and shows a high mechanical and thermal stability and a low temperature dependence of its physical and optical properties. The amount mesogenic compounds with one polymerisable group can be, for example, 0.1 to 99.9% and the amount of mesogenic compounds with two or more polymerisable groups can be, e.g., 0.1 to 99.9%.

Preferably the polymerisable CLC mixture comprises at least one polymerisable mesogenic compound having one polymerisable functional group and at least one polymerisable mesogenic compound having two or more polymerisable functional groups.

By varying the concentration of the multifunctional mesogenic or non mesogenic compounds the crosslink density of the polymer film and thereby its physical and chemical properties such as the glass transition temperature, which is also important for the temperature dependence of the optical properties of the polymerised film, the thermal and mechanical stability or the solvent resistance can be tuned easily.

The polymerisable CLC material may comprise one or more achiral polymerisable mesogenic compounds and one or more chiral polymerisable mesogenic compounds. Alternatively the CLC material may comprise one or more non-polymerisable chiral dopants in addition or alternatively to the chiral polymerisable mesogenic compounds.

Examples of suitable polymerisable mesogenic compounds that can be used for the polymerisable CLC material are disclosed for example in WO 93/22397; EP 0,261,712; DE 195,04,224; WO 95/22586 and WO 97/00600. The compounds disclosed in these documents, however, are to be regarded merely as examples that shall not limit the scope of this invention.

Examples of especially useful chiral and achiral polymerisable mesogenic compounds are shown in the following lists which should, however, be taken only as illustrative and is in no way intended to restrict, but instead to explain the present invention:

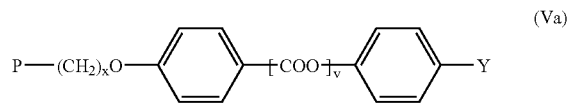
(Va)

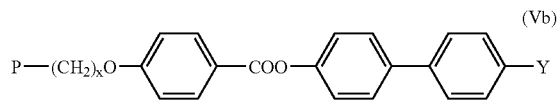
(Vb)

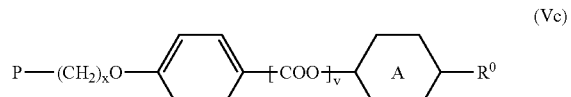
(Vc)

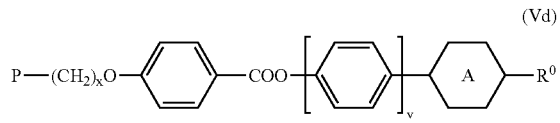
(Vd)

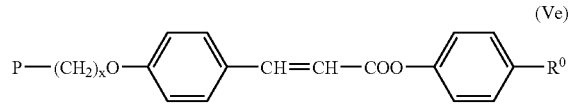
(Ve)

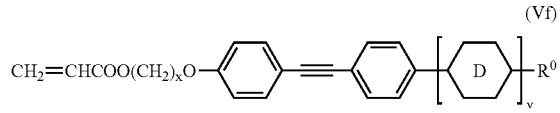
(Vf)

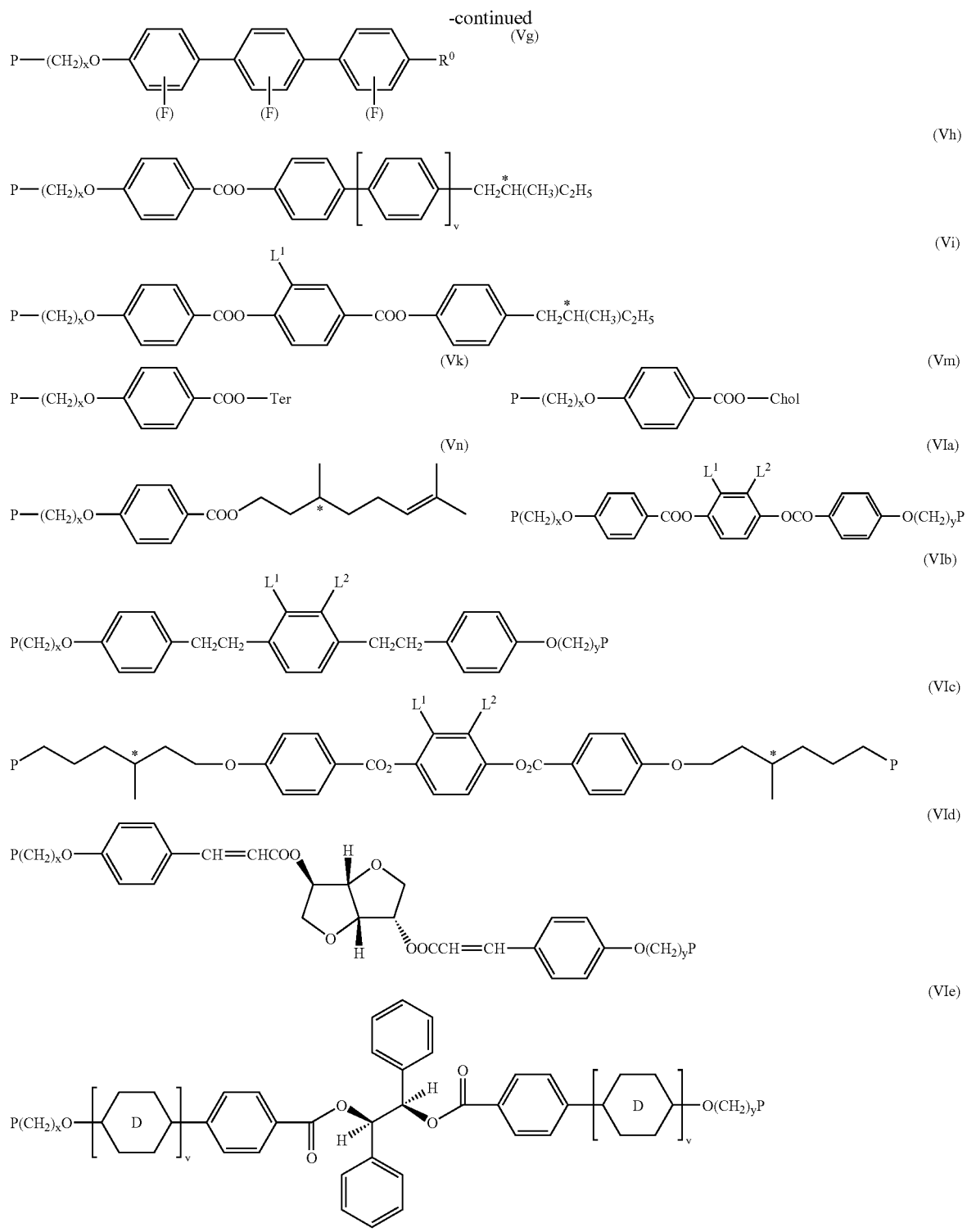

wherein P is a polymerizable group, for example, a vinyl group, an acrylate group, a methacrylate group, a propenyl ether group or an epoxy group, especially preferably an acrylate, methacrylate or vinyl group, x and y are identical or different integers from 1 to 12, A and D are 1,4-phenylene or 1,4-cyclohexylene, v is 0 or 1, Y is a polar group, $R^0$ is a non-polar alkyl or alkoxy group, Ter is a terpenoid radical like, e.g., menthyl, Chol is a cholesteryl group, and $L^1$ and $L^2$ are each independently H, F, Cl, OH, CN, $NO_2$ or optionally alkyl, alkoxy, alkylcarbonyl or alkoxycarbonyl with 1 to 7 C atoms.

The term 'polar group' in this connection means a group selected from F, Cl, CN, $NO_2$, OH, $OCH_3$, OCN, SCN, an optionally fluorinated carbonyl or carboxyl group with up to 4 C atoms or a mono-, oligo- or polyfluorinated alkyl or alkoxy group with 1 to 4 C atoms. The term 'non-polar group' means an alkyl group with 1 or more, preferably 1 to 12 C atoms or an alkoxy group with 2 or more, preferably 2 to 12 C atoms.

The polymerisable CLC material may also comprise one or more non-reactive chiral dopants in addition or alternatively to chiral polymerisable mesogenic compounds. Typically used chiral dopants are e.g. the commercially available R or S 811, R or S 1011, R or S 2011 or CB 15 (from Merck KGaA, Darmstadt, Germany).

Very preferred are chiral dopants with a high helical twisting power (HTP), in particular dopants comprising a sorbitol group as described in WO 98/00428, dopants comprising a hydrobenzoin group as described in GB 2,328,207, chiral binaphthyl derivatives as described in EP 01111954.2, chiral binaphthol acetal derivatives as decribed in EP 01104842.8, chiral TADDOL derivatives as described in WO 02/06265, and chiral dopants with at least one fluorinated linkage group and a terminal or central chiral group as described in WO 02/06196 and WO 02/06195.

The CLC material is preferably polymerised in-situ in a macroscopically oriented state. For this purpose the material is coated preferably directly onto the semiopaque substrate. The coated material is aligned into planar orientation, where the liquid crystal molecules are oriented such that the liquid crystal director is substantially parallel to the substrate. The molecules are then polymerised or crosslinked to fix the uniform orientation of the liquid crystalline molecules. Alignment and curing are carried out in the liquid crystal phase or mesophase of the material. This technique is known in the art and is generally described for example in D. J. Broer, et al., Angew. Makromol. Chem. 183, (1990), 45–66. Alternatively the CLC layer can also be prepared on an auxiliary substrate, from which it is then removed and laminated onto the semiopaque substrate.

Alignment of the CLC material can be achieved for example by treatment of the substrate onto which the material is coated, by shearing the material during or after coating, by application of a magnetic or electric field to the coated material, or by the addition of surface-active compounds to the polymerisable material. Reviews of alignment techniques are given for example by I. Sage in "Thermotropic Liquid Crystals", edited by G. W. Gray, John Wiley & Sons, 1987, pages 75–77, and by T. Uchida and H. Seki in "Liquid Crystals—Applications and Uses Vol. 3", edited by B. Bahadur, World Scientific Publishing, Singapore 1992, pages 1–63. A review of alignment materials and techniques is given by J. Cognard, Mol. Cryst. Liq. Cryst. 78, Supplement 1 (1981), pages 1–77.

Polymerisation of the CLC material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation at a non-absorbing wavelength. As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

The polymerisation is carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. When curing polymerisable mesogens with acrylate or methacrylate groups, preferably a radical photoinitiator is used, when curing polymerisable mesogens vinyl, epoxide and oxetane groups, preferably a cationic photoinitiator is used. It is also possible to use a polymerisation initiator that decomposes when heated to produce free radicals or ions that start the polymerisation. As a photoinitiator for radical polymerisation for example the commercially available Irgacure 651, Irgacure 184, Darocure 1173 or Darocure 4205 (all from Ciba Geigy AG) can be used, whereas in case of cationic photopolymerisation the commercially available UVI 6974 (Union Carbide) can be used.

The polymerisable CLC material can additionally comprise one or more other suitable components such as, for example, catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

The CLC material may additionally comprise a polymeric binder or one or more monomers capable of forming a polymeric binder and/or one or more dispersion auxiliaries. Suitable binders and dispersion auxiliaries are disclosed for example in WO 96/02597.

Especially preferred are liquid crystal materials not containing a binder or dispersion auxiliary.

In another preferred embodiment the CLC material comprises an additive that induces or enhances planar alignment of the liquid crystal material on the substrate. Preferably the additive comprises one or more surfactants. Suitable surfactants are described for example in J. Cognard, Mol. Cryst.Liq.Cryst. 78, Supplement 1, 1–77 (1981). Particularly preferred are non-ionic surfactants, very fluorocarbon surfactants, like for example the commercially available fluorocarbon surfactants Fluorad FC-171® (from 3M Co.), or Zonyl FSN® (from DuPont).

Suitable additives are disclosed for example in WO 00/47694, the entire disclosure of which is incorporated into this application by reference.

In particular the addition of stabilizers is preferred in order to prevent undesired spontaneous polymerisation of the polymerisable material for example during storage. As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

Other additives, like, e.g., chain transfer agents, can also be added to the polymerisable LC material in order to modify the physical properties of the resulting polymer film. When adding a chain transfer agent, such as monofunctional thiol compounds like, e.g., dodecane thiol or multifunctional thiol compounds like, e.g., trimethylpropane tri(3-mercaptopropionate), to the polymerisable material, the length of the free polymer chains and/or the length of the polymer chains between two crosslinks in the inventive polymer film can be controlled. When the amount of the chain transfer agent is increased, the polymer chain length in the obtained polymer film is decreasing.

It is also possible, in order to increase crosslinking of the polymers, to add up to 20% of a non mesogenic compound with two or more polymerisable functional groups to the polymerisable LC material alternatively or in addition to the di- or multifunctional polymerisable mesogenic compounds to increase crosslinking of the polymer. Typical examples for difunctional non mesogenic monomers are alkyldiacrylates or alkyldimethacrylates with alkyl groups of 1 to 20 C atoms. Typical examples for non mesogenic monomers with more than two polymerisable groups are trimethylpropane trimethacrylate or pentaerythritole tetraacrylate.

In another preferred embodiment the mixture of polymerisable material comprises up to 70%, preferably 3 to 50% of a non mesogenic compound with one polymerisable functional group. Typical examples for monofunctional non mesogenic monomers are alkylacrylates or alkylmethacrylates.

It is also possible to add, for example, a quantity of up to 20% by weight of a non polymerisable liquid-crystalline compound to adapt the optical properties of the resulting polymer film.

The optically variable marking according to the present invention is especially suitable for use in security markings or security threads to authenticate, verify or prevent counterfeiting of objects like data carriers or documents of value, and for identification of hidden images, information or patterns on such objects. It can be directly applied onto said objects for verification or prevention of counterfeiting. Alternatively it can be applied onto an object, such as a data carrier or document of value, comprising additional data and/or information applied to the object for example in the form of an information indicating layer, a hologram, watermark, embossed or imprinted pattern or design, or the like. The optically variable marking can be applied onto said object such that it partially or completely covers the additional data and/or information, or may be applied onto a portion or region of said object not containing the additional data and/or information.

For example, to provide security threads, a foil can be prepared comprising an optically variable layer, a semi-opaque substrate and a metallised layer. A laser can be used to remove selected parts of the metallised layer without destroying any of the optically variable layer or semi-opaque substrate to introduce a particular design and/or text.

This marked foil can then be split into thin threads which can be woven into a security paper in accordance with procedures known to one skilled in the art. When viewed under normal conditions in reflected light, only the effect of the optically variable layer is seen. However, when held against strong back lighting the marked areas will become visible. This gives an additional effect similar to a watermark which will be difficult to copy.

The optically variable marking according to the present invention can be applied to consumer products or household objects, car bodies, foils, packing materials, clothes or woven fabric, incorporated into plastic, or applied as security markings or threads on documents of value like banknotes, credit cards or ID cards, national ID documents, licenses or any product with money value, like stamps, tickets, shares, cheques etc.

Due to its different effects when viewed in transmission and reflection, the optically variable marking according to the present invention is especially suitable and preferably used for the above described purposes on objects and products as mentioned above that are light transmissive, especially for visible light, or on light transmissive regions or portions of said objects or products.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLE 1

The following polymerisable CLC mixture is prepared

| | |
|---|---|
| compound (A) | 32.60% |
| compound (B) | 3.00% |
| compound (C) | 30.16% |
| compound (D) | 29.56% |
| compound (E) | 3.59% |
| Irgacure 651 | 1.08% |

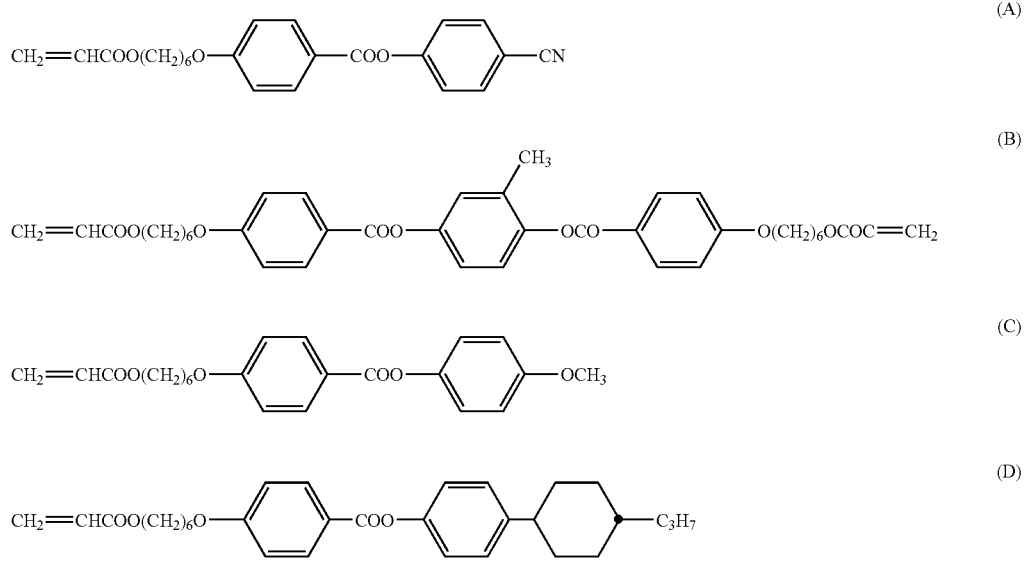

-continued

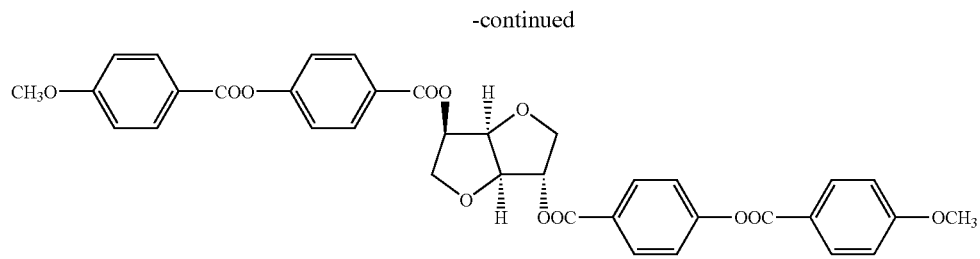
(E)

The polymerisable mesogenic compounds (A), (B) and (C) can be prepared according to or in analogy to the methods described in D. J. Broer et al., Makromol.Chem. 190, 3201–3215 (1989). The polymerisable mesogenic compound (D) and its preparation are described in GB 2,280, 445. The chiral dopant (E) and its preparation are described in WO 98/00428. Irgacure 651 is a commercially available photoinitiator (Ciba Geigy).

The mixture is coated onto the PET side of a metallised PET film and polymerised by irradiation with UV light. Preferably the PET is darkened to about 95% absorbance. The coated structure is then exposed to laser light (Nd-YAG laser,1064 nm, 100 W) through the coating, and the aluminium coating is removed from the film only in the places exposed to laser light. The coating is unaffected.

When viewed in normal conditions i.e. without a strong light source behind the film, the reflected colour is seen and no design is discernible. However when viewed against a strong light source the design is visible at the places where light is transmitted through the substrate and the film. The transmitted light is of a different colour than the reflected light.

The entire disclosure of all applications, patents and publications, cited herein and of corresponding European Patent Application No. 01 114 895.4, filed on Jul. 2, 2001 are incorporated by reference herein.

The preceeding examples can be repeated with similar success by substituting the generically or specifically described reactants and/or operating conditions of this invention for those used in the preceeding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An optically variable marked substrate comprising a semiopaque substrate with a first surface that is covered with an optically variable layer and a second surface that is partially covered with a metal or metallised layer in the shape of a pattern, wherein the optically variable layer comprises one or more optically variable pigments dispersed in a transparent binder.

2. A marked substrate according to claim 1, wherein the optically variable pigments are selected from interference, pearl-lustre and liquid crystal pigments.

3. A marked substrate according to claim 1, wherein the optically variable pigments are flakes comprising a mica, $SiO_2$, $Al_2O_3$, $TiO_2$ or glass substrate that is coated with one or more layers selected from titanium dioxide, iron oxide, titanium iron oxide, chrome oxide or combinations thereof.

4. A marked substrate according to claim 1, wherein the optically variable layer thickness is 1 to 50 microns.

5. A marked substrate according to claim 4, wherein the metallised layer thickness is 10 to 1000 nanometers.

6. A marked substrate according to claim 1, wherein the metallised layer thickness is 10 to 1000 nanometers.

7. A marked substrate according to claim 1, wherein the optically variable layer thickness is 1 to 10 microns, and the metallised layer thickness is 100 to 500 nanometers.

8. A security marking, document of value, thread or device, hologram, hot stamping foil or watermark, for the purpose of prevention of counterfeiting, authentification, verification, or identification of data or information, comprising an optically variable marked substrate according to claim 1.

9. A security marking, document of value, thread or device, hologram, hot stamping foil or watermark, for the purpose of prevention of counterfeiting, authentification, verification, or identification of data or information, comprising an optically variable marked substrate according to claim 5.

10. In an optically variable marked substrate for use in a decorative or security application, the improvement wherein said substrate is a marked substrate according to claim 1.

11. A method of preparing a marked substrate according to claim 1, said method comprising:
coating a layer of optically variable pigments dispersed in a transparent binder onto said first surface of a semiopaque substrate the second surface of which is metallised,
optionally curing the transparent binder, and
removing selected areas of the metal layer form the second substrate surface by means of a laser to form a pattern.

12. An optically variable marked substrate comprising a semiopaque substrate with a first surface that is covered with an optically variable layer and a second surface that is partially covered with a metal or metallised layer in the shape of a pattern, wherein the semiopaque substrate is a plastic film comprising light absorbing particles.

13. A marked substrate according to claim 12, wherein the light absorbing particles are selected from carbon black and absorbing pigments.

14. A marked substrate according to claim 12, wherein the optically variable layer comprises a polymerised cholesteric liquid crystal material with planar orientation.

15. A marked substrate according to claim 12, wherein the optically variable layer comprises one or more optically variable pigments dispersed in a transparent binder.

16. A marked substrate according to claim 15, wherein the optically variable pigments are selected from interference, pearl-lustre and liquid crystal pigments.

17. An optically variable marked substrate comprising a semiopaque substrate with a first surface that is covered with an optically variable layer and a second surface that is partially covered with a metal or metallised layer in the shape of a pattern, wherein the semiopaque substrate is a circular polariser film.

18. An optically variable marked substrate comprising a semiopaque substrate with a first surface that is covered with an optically variable layer and a second surface that is partially covered with a metal or metallised layer in the shape of a pattern, wherein the optically variable layer comprises a polymerised cholesteric liquid crystal material with planar orientation.

19. A marked substrate according to claim 18, wherein the optically variable layer thickness is 1 to 50 microns.

20. A marked substrate according to claim 19, wherein the metallised layer thickness is 10 to 1000 nanometers.

21. A marked substrate according to claim 18, wherein the metallised layer thickness is 10 to 1000 nanometers.

22. A marked substrate according to claim 18, wherein the optically variable layer thickness is 1 to 10 microns, and the metallised layer thickness is 100 to 500 nanometers.

23. A marked substrate according to claim 18, wherein said polymerised cholesteric liquid crystal material comprises at least one polymerisable mesogenic compound having one polymerisable functional group and at least one polymerisable mesogenic compound having two or more polymerisable functional groups.

24. A marked substrate according to claim 18, wherein said polymerised cholesteric liquid crystal material comprises one or more achiral polymerisable mesogenic compounds and one or more chiral polymerisable mesogenic compounds.

25. A marked substrate according to claim 18, wherein said polymerised cholesteric liquid crystal material comprises at least one compound selected from the following formulae:

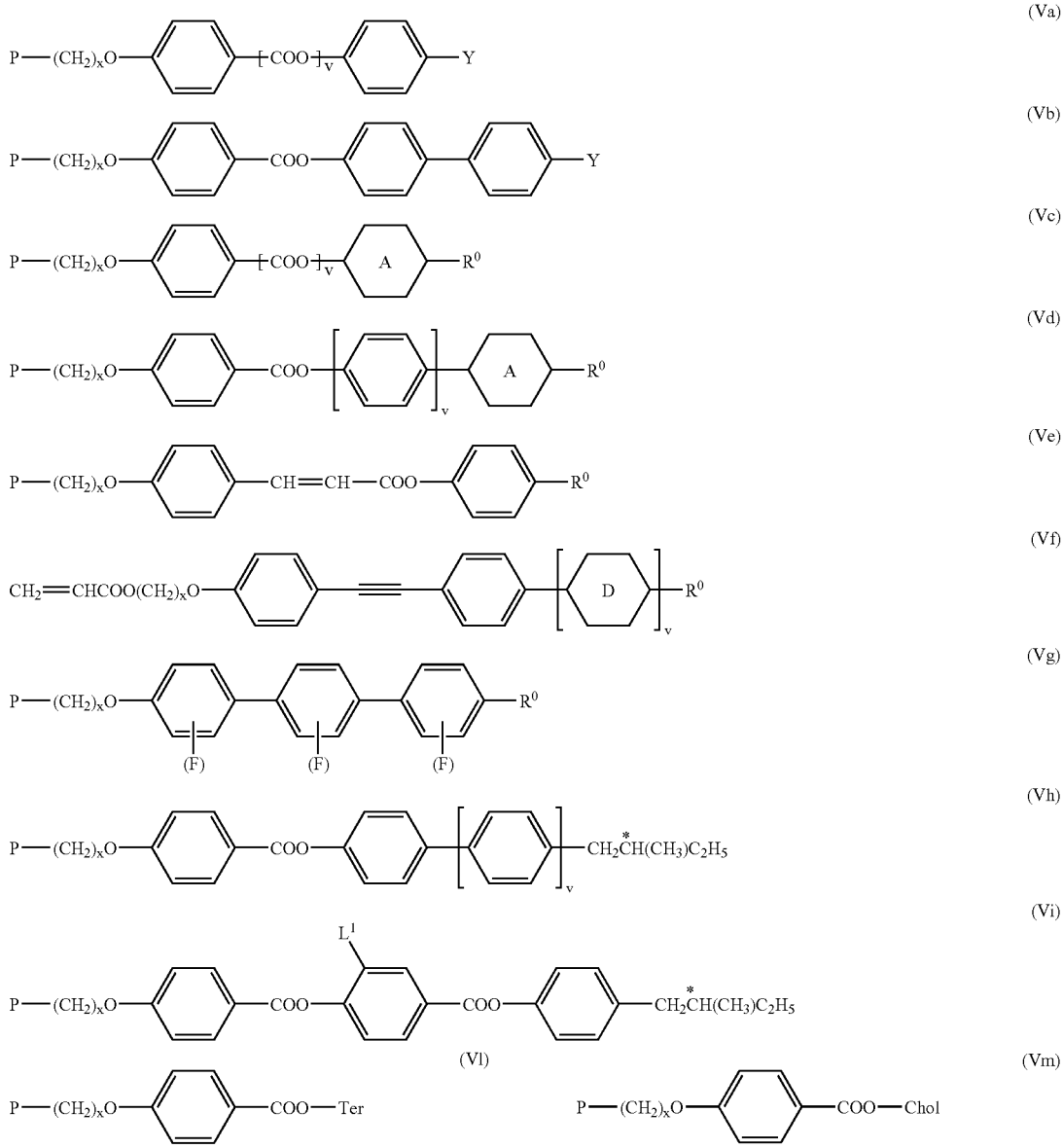

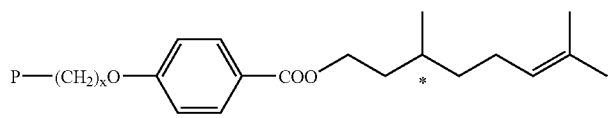
(Vn)

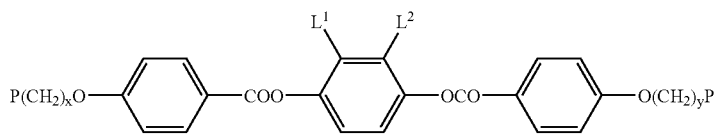
(VIa)

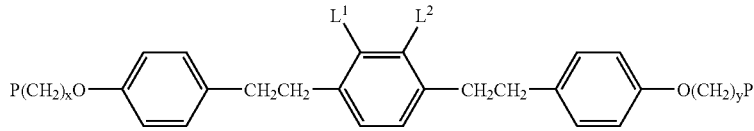
(VIb)

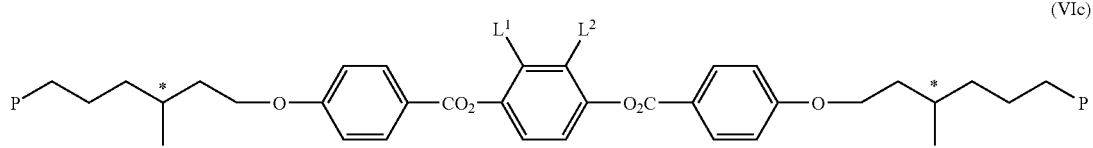
(VIc)

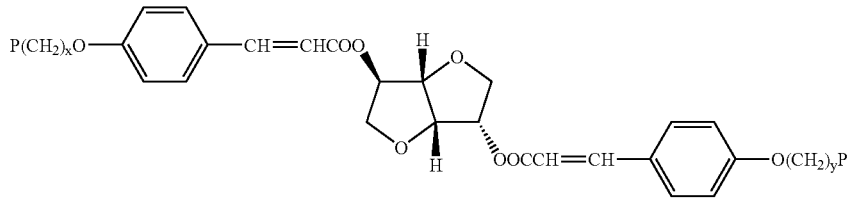
(VId)

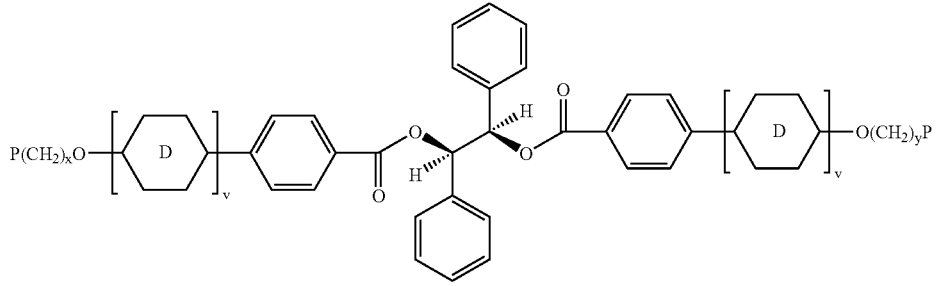
(VIe)

wherein
- P is a polymerizable group selected from vinyl, acrylate groups, a methacrylate groups, propenyl ether or and epoxy groups,
- x and y are identical or different integers from 1 to 12,
- A and D are 1,4-phenylene or 1,4-cyclohexylene,
- v is 0 or 1,
- Y is F, Cl, CN, $NO_2$, OH, $OCH_3$, OCN, SCN, an optionally fluorinated carbonyl or carboxyl group with up to 4 C atoms or a mono-, oligo- or polyfluorinated alkyl or alkoxy group with 1 to 4 C atoms,
- $R^0$ is a non-polar alkyl group with 1 to 12 C atoms or non-polar alkoxy group with 2 to 12 C atoms,
- Ter is menthyl,
- Chol is a cholesteryl group, and
- $L^1$ and $L^2$ are each independently H, F, Cl, OH, CN, $NO_2$, alkyl with 1 to 7 C atoms, alkoxy with 1 to 7 C atoms, alkylcarbonyl with up to 7 C atoms, or alkoxycarbonyl with up to 7 C atoms.

26. In an optically variable marked substrate for use in a decorative or security application, the improvement wherein said substrate is a marked substrate according to claim 18.

27. A method of preparing a marked substrate according to claim 18, said method comprising:
- coating a layer of polymerizable cholesteric liquid crystal material onto said first surface of said semiopaque substrate, wherein said second surface of said substrate is metallised,
- aligning said cholesteric material into planar orientation,
- polymerizing the aligned material in its cholesteric phase, and
- removing selected areas of the metal layer from said second surface by means of a laser to form a pattern.

* * * * *